(12) United States Patent
Bay et al.

(10) Patent No.: US 8,911,829 B2
(45) Date of Patent: Dec. 16, 2014

(54) METHOD OF ELIMINATING DEFECTS WHILE EXTRUSION COATING FILM USING SPEED CONTROL OF THE NIP ROLL

(75) Inventors: Randy S. Bay, Woodbury, MN (US); Todd G. Pett, Minneapolis, MN (US); Brent R. Hansen, New Richmond, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/695,339

(22) PCT Filed: May 27, 2010

(86) PCT No.: PCT/US2010/036412
§ 371 (c)(1),
(2), (4) Date: Oct. 30, 2012

(87) PCT Pub. No.: WO2011/149468
PCT Pub. Date: Dec. 1, 2011

(65) Prior Publication Data
US 2013/0059080 A1    Mar. 7, 2013

(51) Int. Cl.
*B05D 3/12* (2006.01)
*B05D 1/28* (2006.01)
*B05D 5/00* (2006.01)
*B29C 43/28* (2006.01)
*B29C 47/02* (2006.01)
*B29C 47/52* (2006.01)
*B29C 47/00* (2006.01)

(52) U.S. Cl.
CPC ......... *B29C 43/28* (2013.01); *B29K 2995/0018* (2013.01); *B29C 47/025* (2013.01); *B29C 2947/92923* (2013.01); *B29C 47/522* (2013.01); *B29C 2947/9259* (2013.01); *B29C 47/0021* (2013.01)
USPC ....... 427/365; 427/256; 427/428.07; 427/184

(58) Field of Classification Search
CPC ............. B29C 2947/9259; B29C 2947/92923; B29C 43/28; B29C 47/025; B29C 47/522
USPC ........................................................ 427/365
See application file for complete search history.

(56) References Cited

U.S. PATENT DOCUMENTS 3,669,794 A    6/1972    Mazur
3,893,795 A *  7/1975    Nauta ........................... 425/403

(Continued)

FOREIGN PATENT DOCUMENTS

JP    08-108476    4/1996
WO   WO 95/17303   6/1995

(Continued)

*Primary Examiner* — Dah-Wei D Yuan
*Assistant Examiner* — Kristen A Dagenais
(74) *Attorney, Agent, or Firm* — Yufeng Dong; Douglas B. Little; Stephen L. Cook

(57) ABSTRACT

It has now been determined that an internal optical defect can be eliminated by controlling the relative speed mismatch between the resilient roll and the casting roll in a film extrusion coating process. In particular, slowing down the surface speed of the resilient roll relative to the casting roll when coating a biaxially orientated film was found to remove the optical defect. Conversely, speeding up the surface speed of the resilient roll relative to the casting roll when coating a uniaxially orientated film was found to remove the optical defect.

7 Claims, 4 Drawing Sheets

(56) References Cited

U.S. PATENT DOCUMENTS

| | | | |
|---|---|---|---|
| 4,167,914 A | 9/1979 | Miadota | |
| 4,913,858 A * | 4/1990 | Miekka et al. | 264/1.34 |
| 5,825,543 A | 10/1998 | Ouderkirk | |
| 5,867,316 A | 2/1999 | Carlson | |
| 5,882,774 A | 3/1999 | Jonza | |
| 6,254,712 B1 | 7/2001 | Enlow et al. | |
| 6,296,732 B1 * | 10/2001 | Enlow et al. | 156/209 |
| 6,352,761 B1 | 3/2002 | Hebrink | |
| 6,368,699 B1 | 4/2002 | Gilbert | |
| 6,783,349 B2 | 8/2004 | Neavin | |
| 6,890,649 B2 * | 5/2005 | Hobbs et al. | 428/365 |
| 6,927,900 B2 | 8/2005 | Liu | |
| 6,939,499 B2 | 9/2005 | Merrill | |
| 7,279,198 B1 | 10/2007 | Knauf | |
| 7,311,780 B2 * | 12/2007 | Leonard et al. | 118/110 |
| 7,604,381 B2 | 10/2009 | Hebrink | |
| 8,349,228 B2 | 1/2013 | Kazama | |
| 2001/0013668 A1 | 8/2001 | Neavin | |
| 2001/0052385 A1 | 12/2001 | Enlow | |
| 2005/0022925 A1 | 2/2005 | Janssen | |
| 2005/0247960 A1 | 11/2005 | Rim | |
| 2006/0057405 A1 | 3/2006 | Kagawa | |
| 2006/0084780 A1 | 4/2006 | Hebrink | |
| 2006/0263530 A1 * | 11/2006 | Vaish et al. | 427/355 |
| 2007/0151468 A1 * | 7/2007 | Strand | 101/6 |
| 2008/0233310 A1 * | 9/2008 | Fujita | 428/1.6 |
| 2010/0026940 A1 | 2/2010 | Takegami | |
| 2010/0055404 A1 | 3/2010 | Yamada | |
| 2010/0258960 A1 | 10/2010 | Takahata | |

FOREIGN PATENT DOCUMENTS

| | | |
|---|---|---|
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 2008/144656 | 11/2008 |

* cited by examiner

METHOD OF ELIMINATING DEFECTS WHILE EXTRUSION COATING FILM USING SPEED CONTROL OF THE NIP ROLL

BACKGROUND

Extrusion coated optical films are produced for a variety of uses such as reflectors, polarizers, and band-pass filters. Since these films are made for their optical properties, controlling the clarity or haze of the extrusion coated film that is produced is extremely important. Even small deviations in the clarity or haze of the extrusion coated film, such as those caused by optical defects, can make the product unsuitable for its intended application.

SUMMARY

It has now been determined that an internal optical defect can be eliminated by controlling the relative speed mismatch between the resilient roll and the casting roll in a film extrusion coating process. In particular, slowing down the surface speed of the resilient roll relative to the casting roll when coating a biaxially orientated film was found to remove the optical defect (under speed). Conversely, speeding up the surface speed of the resilient roll relative to the casting roll when coating a uniaxially orientated film was found to remove the optical defect (over speed).

The exact cause of the optical defect is unknown and is thought to be related to trapped air between the film and the extrusion coating as the coated film enters into the nip between the resilient roll and the casting roll. The optical defect is often found to be internal to the coated film and is not present on either surface of the coated film. Utilizing speed control to remove an internal optical defect was an unexpected finding since similar coated films produced with and without the optical defect had essentially the same overall thickness and surface characteristics, which would have been expected to change from using differential speed control. The exact mechanism for how a surface speed mismatch in the nip changes the internal optical properties of the coated film is not completely understood. It is also not understood why one type of film requires an over speed while another type requires an under speed. Based on nip mechanics, one would have expected that only the external surface properties of the coated films would have been altered by changing the relative surface speeds.

Hence, in one embodiment, the invention resides in a method of eliminating an optical defect in an extrusion coated film comprising: conveying a film to a coating station comprising a resilient roll nipped with a casting roll and an extrusion coating die adjacent to the nip; contacting the film with the resilient roll while extruding a polymeric material into the nip; and adjusting the surface speed of the resilient roll to be different from the surface speed of the casting roll to eliminate optical defects, such that the difference between the surface speed of the resilient roll and the surface speed of the casting roll is no more than ±5% of the surface speed of the casting roll.

In another embodiment, the invention resides in a method of eliminating an optical defect in an extrusion coated film comprising: conveying a film to a coating station comprising a resilient roll nipped with a casting roll and an extrusion die adjacent to the nip, wherein the casting roll has a plurality of peaks and valleys for forming a microreplicated pattern on the film, and wherein a nip pressure in the nip is at least 100 pounds/linear inch (175 N/cm); contacting the film with the resilient roll while extruding a polymeric material into the nip; and adjusting the surface speed of the resilient roll to be different from the surface speed of the casting roll to eliminate optical defects.

In another embodiment, the invention resides in a method of eliminating an optical defect in an extrusion coated film comprising: conveying a film to a coating station comprising a resilient roll nipped with a casting roll and an extrusion die adjacent to the nip; contacting the film with the resilient roll while extruding a polymeric material into the nip to form a coated layer at least 2 times thicker than the thickness of the film; and adjusting the surface speed of the resilient roll to be different from the surface speed of the casting roll to eliminate optical defects.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1:
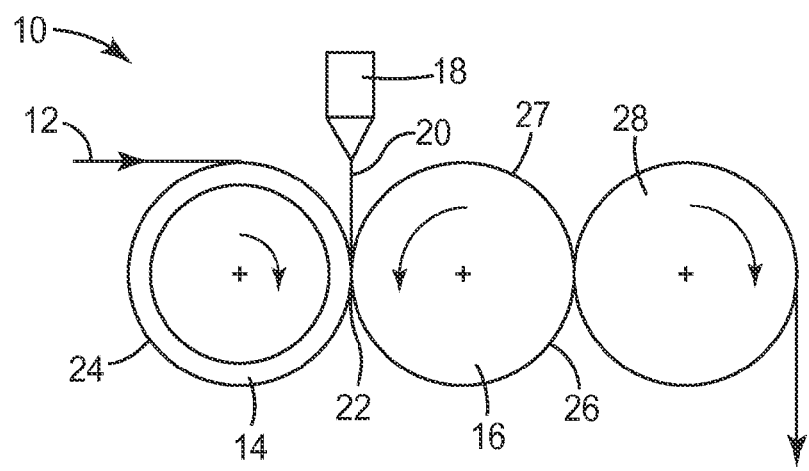
FIG. 1 illustrates a coating station for extrusion coating onto a film.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, a "film" is polymeric web having a thickness significantly less than its width or length.

DETAILED DESCRIPTION

Referring now to FIG. 1, a coating station 10 for extrusion coating a film 12 is illustrated. The coating station 10 includes a resilient roll 14 nipped with a casting roll 16. An extrusion die 18 for extruding a polymeric material 20 into the nip 22 is located adjacent to the nipped rolls. The incoming film 12 is supplied from an upstream process, such as an unwind, and it contacts the outer surface 24 of the resilient roll. Typically, the film 12 is wrapped around at least a portion of the outer surface 24 of the resilient roll.

As the film 12 enters the nip 22, the polymeric material 20 coats one of its major exterior surfaces. Thereafter, the extrusion coated film 26 is conveyed about the outer surface 27 of the casting roll 16 whereupon the polymeric material 20 begins to cool and solidify onto the film. Typically, the casting roll 16 is a chilled roll and has the capability of being cooled internally with water. A third roll 28 may be nipped with the casting roll 16 and the extrusion coated film transferred to the outer surface of the third roll 28. The third roll 28 can be used to extend the contact time of the extrusion coated film with the casting roll 16 by creating a greater web wrap about the circumference of the casting roll. Thereafter, the extrusion coated film 26 is removed from contact with the third roll 28 and conveyed for further downstream processing such winding.

It has been determined that by adjusting the surface speed of the resilient roll 14 to be different from the surface speed of the casting roll 16, optical defects in the extrusion coated film 26 can be eliminated. These optical defects are often only internal to the extrusion coated film and are formed at the interface between the incoming film and the extruded polymeric material as the film 12 traverses the nip 22. The optical defects may appear in either of two ways resembling either a down-web, continuous, or semi-continuous narrow band of trapped air or secondly as cross machine direction wrinkles or bars that are on the surface of the extrusion coated film.

In some embodiments, it has been found that the surface speed of the resilient roll 14 should be adjusted such that it is less than ±5% faster or slower than the surface speed of the casting roll, less than ±3% faster or slower than the surface speed of the casting roll, less than ±2% faster or slower than the surface speed of the casting roll, or less than ±1% faster or slower than the surface speed of the casting roll, but not equal to the surface speed of the casting roll, to eliminate the optical defects. Furthermore, when the film 12 is uniaxially oriented, it was found that the surface speed of the resilient roll needed to be adjusted to be greater than the surface speed of the casting roll to remove the optical defects. Conversely, when the film is biaxially oriented, it was found that the surface speed of the resilient roll needed to be adjusted to be less than the surface speed of the casting roll to remove the optical defects.

Suitable incoming films 12 for use with the process include those typically used to make optical films; although, other films may be also be employed. Suitable films can include without limitation single or multilayer films comprising, polymer films, polyester films, polycarbonate films, polyethylene films, polypropylene films, polyvinyl chloride films, nylon films, ethylene vinyl acetate films, and combinations thereof.

Useful optical films include commercially available optical films marketed as VIKUITI™ Dual Brightness Enhanced Film (DBEF), VIKUITI™ Brightness Enhanced Film (BEF), VIKUITI™ Diffuse Reflective Polarizer Film (DRPF), VIKUITI™ Enhanced Specular Reflector (ESR), VIKUITI™ Advanced Polaring Film (APF), all available from 3M Company. Useful optical films are also described in U.S. Pat. Nos. 5,825,543; 5,867,316; 5,882,774; 6,352,761 B1; 6,368,699 B1; 6,927,900 B2; U.S. 2006/0084780 A1; 2001/0013668 A1; U.S. Ser. No. 09/229,724; WO 95/17303; WO 95/17691; WO95/17692; WO 95/17699; WO 96/19347; WO 97/01440; WO 99/36248; and WO99/36262. These optical films are merely illustrative and are not meant to be an exhaustive list of suitable optical films that can be used.

The optical film may have one or more non-optical layers, i.e., layers that do not significantly participate in the determination of the optical properties of the optical film. The non-optical layers may be used to impart or improve mechanical, chemical, optical, etc. any number of additional properties as described in any of the above references; tear or puncture resistance, weatherability, solvent resistance.

Suitable film thicknesses can vary, but thinner films typically will see more benefit from the differential surface speed. In some embodiments, the film thickness can be less than about 4 mils (0.102 mm), or less than about 3 mils (0.076 mm), or less than about 2 mils (0.051 mm). Thinner incoming film thicknesses are believed to be more useful with differential surface speed to remove optical defects because as the film becomes thinner, a larger temperature rise occurs in the film in the nip as the extruded polymeric material is applied, which can lead to an increased propensity for internal optical film defects to occur.

Suitable polymeric materials 20 for use with the process include extrudable polymers used to make optical films; although, other polymers may be employed. The polymeric material that may be used include one or more polymers selected from styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene. Particularly useful polymers that may be used include styrene acrylonitrile copolymers known as TYRIL copolymers available from Dow Chemical; examples include TYRIL 880 and 125. Other particularly useful polymers that may be used include styrene maleic anhydride copolymer DYLARK 332 and styrene acrylate copolymer NAS 30, both from Nova Chemical. Also useful are polyethylene terephthalate blended with nucleating agents such as magnesium silicate, sodium acetate, or methylenebis(2,4-di-t-butylphenol) acid sodium phosphate.

Other useful polymers include polymers having a have high refractive indices for increased collimation of light, for example, greater than about 1.59 as measured at 630 nm. Polymers with higher refractive indices will provide increased refraction of light, and with certain surface geometries increased recycling of high angle light, and thus increased gain or normal angle brightness. Exemplary polymers with high refractive indices useful include CoPENs (copolymers of polyethylenenaphthalate), CoPVN (copolymers of polyvinyl naphthalene) and polyimides including polyetherimide.

Other useful extrudable polymers include styrene acrylonitrile copolymers; styrene (meth)acrylate copolymers; styrene maleic anhydride copolymers, nucleated semi-crystalline polyesters; polystyrenes; syndiodactic polystyrene; polystyrene and polyphenylene oxide blends; blends of styrene-acrylonitrile copolymers; styrene-acrylonitrile and polycarbonate blends; copolymers of acrylonitrile, butadiene, and styrene; and copolymers thereof. Yet other useful extrudable polymers include polyesters, functionally-modified polyolefins, and polyurethanes. Useful polyesters include copolyesters and particularly copolymers of polyethylenenaphthalate which are specifically derived from naphthalene dicarboxylic acid monomers.

The surface speed differential has been found to be more effective to reduce optical defects when extruding a polymeric material that forms an extrusion coated layer at least 2 times thicker than the thickness of the incoming film. In other embodiments of the invention, the extrusion coated layer can be between about 2 to about 6 times thicker than the thickness of the film, or between about 3 to about 5 times thicker than the thickness of the film. Surface speed differential to remove optical defects at lower extrusion coated thicknesses is believed to be less useful because there is less heat rise in the film with lower coating thicknesses. At extreme coating thicknesses, there can be so much heat rise in the film that the film is completely melted loosing its original optical properties.

In some embodiments, the outer surface 27 of the casting roll comprises a pattern often having a plurality of peaks and valleys that forms a microreplicated pattern in the extruded polymeric material as the material is forced into the peaks and valleys by the resilient roll. Patterned casting rolls are disclosed in U.S. Pat. No. 6,783,349 and in U.S. Pat. Publ. No. 2006/0263530. A pattern can be replicated on the casting roll surface or on the surface of plates attached to the casting roll from a master mold that can be formed using methods and techniques generally known to one of skill in the art, or the pattern can be directly machined or engraved into the surface of the casting roll.

One method of forming a pattern includes initially forming structures, such as a structured array, on a substrate to create a master mold. The structures in the structured array may be designed and arranged using computer aided design and manufacturing (CAD/CAM) software that is known to those of skill in the art. Once the pattern is designed, it can be created in a suitable material by any of a number of processes using commonly utilized techniques, such as, for example, a multiple-photon such as a two-photon exposure process, chemical or mechanical etching, laser ablation, photolithography, stereolithography, micromachining, knurling, cutting, scoring, engraving, diamond turning, and the like. Any process or combination of processes may be used, as long as it can flexibly and controllably provide patterns with structures of a variety of sizes, geometric configurations, surface profiles, or combinations thereof.

The patterns are not generally limited, and may include, for example, protruding structures, recessed structures, continuous and discontinuous grooves, and combinations thereof. The patterns formed by the structures may be regular or irregular, and the individual structures in these patterns may be the same or different in one or more shapes, angles, dimensions or combinations thereof.

The surface speed differential has been found to be particularly effective in some embodiments to reduce optical defects when combined with certain ranges for the nip pressure between the resilient roll and the casting roll. Suitable resilient rolls include rolls with an elastomeric covering utilizing materials such as silicone, polyurethane, HYPALON, nitrile, fluoroelastomers, neoprene and EPDM. In general, when the nip pressure is at least 100 pounds/linear inch (175 N/cm) the speed differential has been found to be more effective. In other embodiments, the nip pressure can be between about 100 pounds/linear inch (175 N/cm) to about 1000 pounds/linear inch (1750 N/cm), or between about 500 pounds/linear inch (875 N/cm) to about 1000 pounds/linear inch (1750 N/cm) for maximum effectiveness. Surface speed differential to remove optical defects at lower nip pressures is believed to be undesirable because the surface texture/finish of a patterned casting roll often is not effectively transferred to the surface of the film. Higher nip pressure is believed to be undesirable due to roller deflections and rolling bank coating defects leading to coating uniformity defects

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Comparative Example 1

A multilayer optical film (MOF) reflective polarizing film comprised of alternating layers of polyethylene naphthalene (PEN) and polymethylmethacrylate (PMMA), 0.0034 inch (86.4 microns) thick, and having a transverse orientation, commercially available as DBEF from 3M Company of St. Paul, Minn. was obtained. A general discussion of this sort of MOF can be found in U.S. Pat. No. 5,882,774 entitled "Optical Film." This film was advanced by conventional web-handling mechanisms at 50 feet/minute (15.25 m/minute) past a 3-slot coextrusion die which dispensed a three-layer coextruded construction of Styrene Acrylonitrile (SAN), Acrylonitrile-Butadiene-Styrene (ABS), with a tie layer of maleated olefin between them. More specifically, the SAN layer was 0.0035 inch (88.9 microns) thick of material commercially available as TYRIL 125 from Dow Chemical of Midland, Mich.; the ABS layer was 0.002 inch (50.8 microns) thick of TOYOLAC 900 commercially available from Toray of Tokyo, JP; and the tie layer was 0.0005 inch (12.7 microns) thick of ADMER SE810, commercially available from Mitsui Chemicals of Tokyo, JP. The extrusion coated layer was approximately 1.8 times as thick as the incoming film thickness. The extrusion die was operated at a temperature of 249° C. and dispensed onto the film as it passed around a 12 inch (30.5) diameter casting roll immediately before a nip between the casting roll and a 12 inch (30.5 cm) diameter resilient roll with a compliant silicone covering of AMS80R, commercially available from Rotadyne of Romeoville, Ill. The casting roll was provided with cooling water so as to regulate it to a temperature of 65.5° C. and the casting roll had a matte surface texture on the outer surface with an average roughness of 80 microinches (2 microns), commercially available from Ultra Plating of Green Bay, Wis. Both the casting roll and the resilient roll were provided with active drives including servo-motors and precision gearboxes that allowed the relative speeds to be controlled within 0.1 percent of each other.

Figure 2:
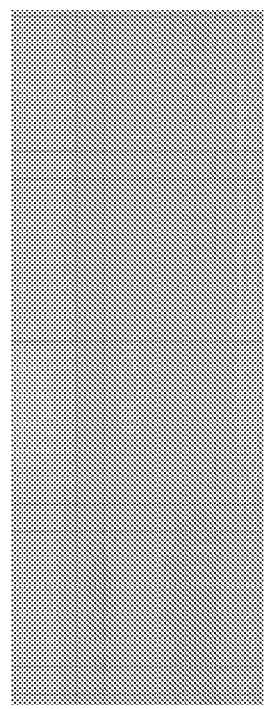
FIG. 2 is a photograph of the film produced by Comparative Example 1.

The extrusion was performed with the film under a tension of 30 pounds (133.4 N) equating to 4.1 pounds/linear inch (7.2 N/linear cm) based on the web's width and at a nip pressure of 62.5 pounds/linear inch (109.4 N/linear cm). The rubber roll was set to match the speed of the casting roll. Referring now to FIG. 2, an image taken in plan view of the resulting film is presented, the image was taken with a line-scan camera mounted about 10 feet (3.04 m) down web of the casting station so as to capture optical variations in light reflected off of the surface of the film. The desired result is a uniformly grey appearance in the center of the coating. As is seen in FIG. 2, no optical film defects are present when matched surface speeds between the rubber roll and the casting roll was used.

Example 2

Figure 3:
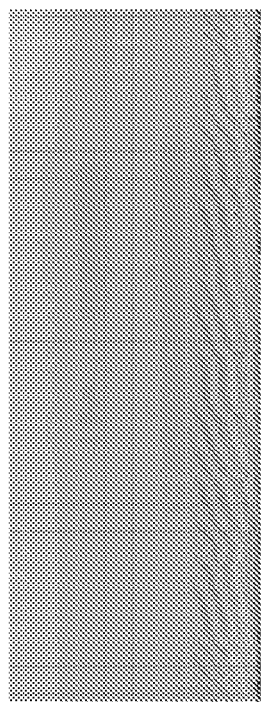
FIG. 3 is a photograph of the film produced by Example 2.

This Example is similar to Comparative Example 1, except that the rubber roll was operated so as to have a surface tangential velocity 1% faster than the casting roll. Referring now to FIG. 3, an image taken in plan view of the resulting film is presented, which clearly shows down-web optical defects or angled wrinkles in the film. In this instance, use of a differential surface speed between the resilient roll and the casting roll caused an optical defect to occur. The film of Comparative Example 1 and Example 2 is relatively stiff and heat stable, mostly because of its thickness, and it was observed to be best coated with a close match between the surface speed of the resilient roll and casting roll.

Example 3

This Example is similar to Comparative Example 1, except that the film used was MOF "A" and the web tension was 5 pounds (22.25 N) [0.6 pounds/linear inch (1.1 N/linear cm)]. MOF "A" as described in WO2008/144656 entitled "Light Recycling Hollow Cavity Type Display Backlight" is a 0.0011 inch (28 microns) thick uniaxially orientated film with transverse orientation produced by 3M Company. The extrusion coated layer was approximately 4.7 times the incoming film thickness. MOF "A" is a cast web multilayer optical film having skin layers made of glycol modified polyethylene terephthalate copolymer (PETg). The optical stack of 305 alternating polymer layers contained high-index layers made from a polyethylene naphthalate copolymer having 90% naphthalate moieties and 10% terephthalate moieties (90:10 coPEN); and low-index isotropic layers made from PETg. The web was then passed into a tenter that was divided into three zones—preheat, stretch, and heat set. Temperatures and dwell times, respectively, for the three zones were as follows: Preheat 146° C., 14 seconds; Stretch 146° C., 22 seconds; Heat Set 146° C., 14 seconds. Transverse draw ratio in the stretch zone was approximately 5.9:1, yielding the final substrate thickness.

Figure 4:
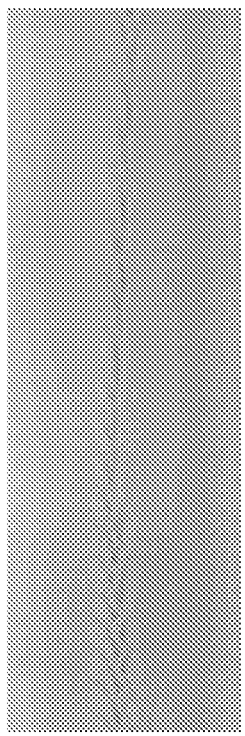
FIG. 4 is a photograph of the film produced by Example 3.

Referring now to FIG. 4, an image taken in plan view of the resulting film is presented, which shows a substantial optical defect (longitudinal wrinkle) when this film was coated and the surface speed of the resilient roll matched the surface speed of the casting roll.

Example 4

Figure 5:
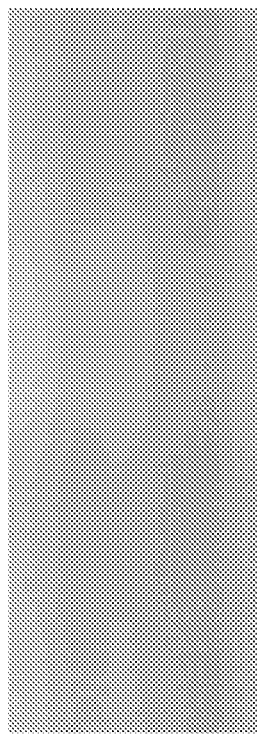
FIG. 5 is a photograph of the film produced by Example 4.

This Example is similar to Example 3, except that the resilient roll was operated so as to have a surface tangential velocity 1% faster than the casting roll. Referring now to FIG. 5, an image taken in plan view of the resulting film is presented, which shows that the use of a surface speed mismatch and in particular, over speed, has eliminated the optical defect from the uniaxially orientated coated film. It was noted for this set of conditions that when the over speed of the resilient roll was increased to have a surface tangential velocity 3% faster than the casting roll, horizontal strips or bars appeared in the film resulting in another optical defect and an upper limit for the amount of over speed for this particular Example.

Example 5

Figure 6:
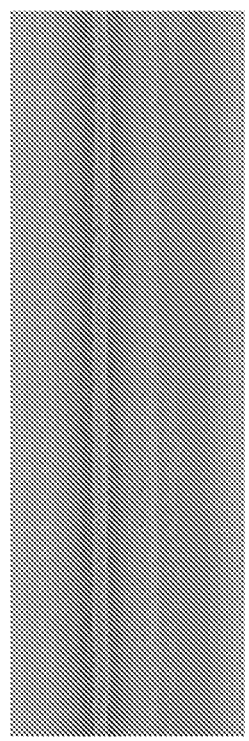
FIG. 6 is a photograph of the film produced by Example 5.

This Example is similar to Comparative Example 1, except that the film was instead VIKUITI™, APF, a 0.0014 inch (35.5 microns) thick uniaxially orientated film produced with parabolic transverse orientation, also available from 3M Company and the web tension was 20 pounds (89 N) [2.4 pounds/linear inch (4.2 N/linear cm)]. A method of making this type of film is disclosed in U.S. Pat. No. 6,939,499. The extrusion coated layer was approximately 4.3 times the incoming film thickness. Referring now to FIG. 6, an image taken in plan view of the resulting film is presented, which shows a substantial optical defect (longitudinal wrinkle) when this film was coated and the surface speed of the resilient roll matched the surface speed of the casting roll.

Example 6

Figure 7:
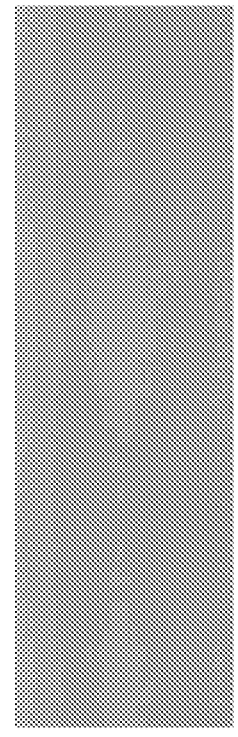
FIG. 7 is a photograph of the film produced by Example 6.

This Example is similar to Example 5, except that the resilient roll was operated so as to have a surface tangential velocity 2% faster than the casting roll. Referring now to FIG. 7, an image taken in plan view of the resulting film is presented, which shows that the use of a surface speed mismatch and in particular, over speed, has eliminated the optical defect from the uniaxially orientated coated film.

Example 7

Figure 8:
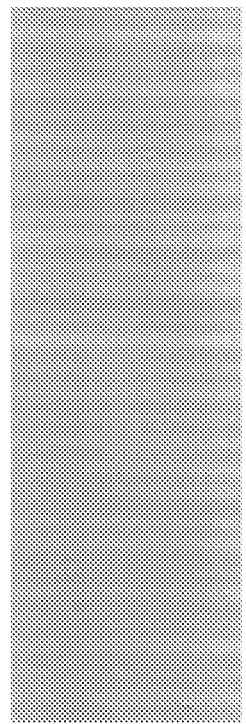
FIG. 8 is a photograph of the film produced by Example 7.

This Example is similar to Comparative Example 1, except that the film was instead VIKUITI™, ESR2, 0.0014 inch (35.5 microns) thick biaxially orientated film, also available from 3M Company, the web tension was 20 pounds (89 N) [2.5 pounds/linear inch (4.4 N/linear cm)], and the nip pressure was 125 pounds/linear inch (218.8 N/cm). The extrusion coated layer was approximately 4.3 times the incoming film thickness. Referring now to FIG. 8, an image taken in plan view of the resulting film is presented, which shows a substantial optical defect (CD wrinkles) when this film was coated and the surface speed of the resilient roll matched the surface speed of the casting roll.

Example 8

Figure 9:
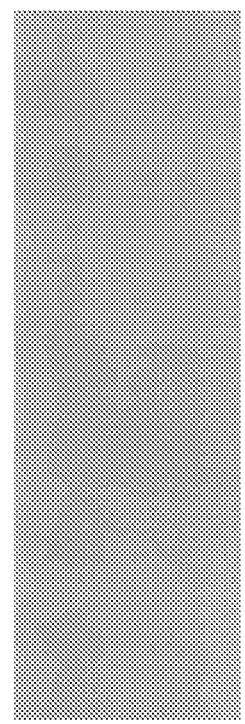
FIG. 9 is a photograph of the film produced by Example 8.

This Example is similar to Example 7, except that the resilient roll was operated so as to have a surface tangential velocity 1% slower than the casting roll. Referring now to FIG. 9, an image taken in plan view of the resulting film is presented, which shows that the use of a surface speed mismatch and in particular, under speed, has eliminated the optical defect from the biaxially orientated coated film.

The following Table summarizes the variables in the above Examples.

| Example Number | Film Used | Web Tension (N) [PLI] | Nip Pressure (N/cm) | Rubber Roll Relative Speed (± %) | Optical Defect? |
|---|---|---|---|---|---|
| 1 | DBEF | 133.4 [4.1] | 109.4 | 0 | No |
| 2 | DBEF | 133.4 [4.1] | 109.4 | +1 | Yes |
| 3 | MOF "A" | 22.3 [0.6] | 109.4 | 0 | Yes |
| 4 | MOF "A" | 22.3 [0.6] | 109.4 | +1 | No |
| 5 | APF | 89.0 [2.4] | 109.4 | 0 | Yes |
| 6 | APF | 89.0 [2.4] | 109.4 | +2 | No |
| 7 | ESR2 | 89.0 [2.4] | 218.8 | 0 | Yes |
| 8 | ESR2 | 89.0 [2.4] | 218.8 | −1 | No |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of eliminating an optical defect in an extrusion coated film, comprising:
    conveying a film that is uniaxially or biaxially oriented to a coating station comprising an elastomeric roll nipped with a casting roll and an extrusion coating die adjacent to the nip, in which the surface speed of the elastomeric roll is controlled independently of the surface speed of the casting roll;
    contacting the film with the elastomeric roll while extruding a polymeric material into the nip, in which nip pressure is at least 100 pounds/linear inch (175N/cm), to make a coated film comprising a coated layer of polymeric material on the film; and adjusting the surface speed of the elastomeric roll to be different from the surface speed of the casting roll to eliminate optical defects in the coated film, such that:

for uniaxially oriented film, surface speed of the elastomeric roll is adjusted to be greater than the surface speed of the casting roll by no more than 5%; and for biaxially oriented film, surface speed of the elastomeric roll is adjusted to be less than the surface speed of the casting roll by no more that 5%.

2. The method of claim 1 wherein an outer surface of the casting roll has a plurality of peaks and valleys for forming a microreplicated pattern on the coated film.

3. The method according to claim 1 wherein the thickness of the film is less than 3 mils (0.076 mm).

4. The method according to claim 1 wherein the difference between the surface speed of the elastomeric roll and the surface speed of the casting roll is no more than ±2% of the surface speed of the casting roll.

5. The method according to claim 1 wherein nip pressure in the nip is between about 500 pounds/linear inch (875 N/cm) and 1000 pounds/linear inch (1750 N/cm).

6. The method according to claim 1 wherein extruding a polymeric material into the nip forms a coated layer between about 2 to about 6 times thicker after passing through the nip than the thickness of the film.

7. The method according to claim 1 wherein the elastomeric roll is provided with an active drive including a servomotor and gear box.

\* \* \* \* \*

UNITED STATES PATENT AND TRADEMARK OFFICE
CERTIFICATE OF CORRECTION

PATENT NO. : 8,911,829 B2
APPLICATION NO. : 13/695339
DATED : December 16, 2014
INVENTOR(S) : Randy Bay Page 1 of 1

It is certified that error appears in the above-identified patent and that said Letters Patent is hereby corrected as shown below:

In the Specification

Column 3
Line 46, Delete "Polaring" and insert -- Polarizing --, therefor.

Column 4
Line 15, Delete "syndiodactic" and insert -- syndiotactic --, therefor.
Line 41, Delete "syndiodactic" and insert -- syndiotactic --, therefor.

Column 5
Line 52, Delete "uniformity defects" and insert -- uniformity defects. --, therefor.

In the Claims

Column 9
Line 12, Claim 1, Delete "that" and insert -- than --, therefor.

Signed and Sealed this
Nineteenth Day of May, 2015

Michelle K. Lee
*Director of the United States Patent and Trademark Office*